United States Patent [19]

Kanno

[11] 4,021,830
[45] May 3, 1977

[54] INFORMATION INDICATING DEVICE IN A CAMERA VIEWFINDER

[75] Inventor: Kyusei Kanno, Tokyo, Japan

[73] Assignee: Asahi Kogaku Kogyo Kabushiki Kaisha, Tokyo, Japan

[22] Filed: May 30, 1975

[21] Appl. No.: 582,497

[30] Foreign Application Priority Data

May 30, 1974 Japan .............................. 49-61111

[52] U.S. Cl. ................. 354/225; 354/54; 354/155
[51] Int. Cl.² .................. G03B 13/02; G03B 19/12
[58] Field of Search ........... 354/224, 225, 155, 54, 354/55

[56] References Cited

UNITED STATES PATENTS

| | | | |
|---|---|---|---|
| 3,128,684 | 4/1964 | Trankner et al. | 354/54 |
| 3,387,530 | 6/1968 | Ebertz | 354/225 |
| 3,657,985 | 4/1972 | Uno | 354/155 |
| 3,757,656 | 9/1973 | Kuramoto | 354/225 |
| 3,828,644 | 8/1974 | Uchida | 354/54 |
| 3,840,298 | 10/1974 | Okuno | 354/155 |

*Primary Examiner*—Edna M. O'Connor
*Attorney, Agent, or Firm*—Sughrue, Rothwell, Mion, Zinn & Macpeak

[57] ABSTRACT

An information indicating device for a viewfinder of a single lens reflex camera using a pentaprism is disclosed. The device includes a thin, substantially triangular shaped prism element having a shape similar to the shape at a side face of the pentaprism to which it is attached. A second thin prism element is attached to the external surface of the third reflection face of the pentaprism. Light information obtained from a part of the triangular prism is transmitted to the second thin prism element and then introduced into the pentaprism through a transparent slot formed in the third reflection face of the pentaprism.

3 Claims, 4 Drawing Figures

INFORMATION INDICATING DEVICE IN A CAMERA VIEWFINDER

SUMMARY OF THE INVENTION

The present invention generally relates to an information indicating device in a camera viewfinder, and more particularly to a device for indicating information such as the distance to the object being photographed, the lens aperture value, the shutter speed or the like in or around the image viewed through the viewfinder of a single lens reflex camera using a pentaprism. The device includes a thin substantially triangular shaped prism element having a shape similar to the shape of a side face of the pentaprism to which it is attached. A second thin prism element is attached to the external surface of the third reflection face of the pentaprism. Light information obtained from a part of the substantially triangular prism is transmitted to the second thin shaped prism element and then introduced into the pentaprism through a transparent slot formed in the third reflection face of the pentaprism. The resulting structure is both compact and inexpensive to manufacture.

BRIEF DESCRIPTION OF THE DRAWINGS

The specific nature of the invention, as well as other objects, aspects, uses and advantages thereof, will clearly appear from the following description and from the accompanying drawing, in which.

DESCRIPTION OF THE PREFERRED EMBODIMENT

In a generally used pentaprism type viewfinder, a real image formed on the lower face of the pentaprism by a taking lens and a mirror (both not shown) is transmitted through the first transmission face 1, reflected by the first and second reflection faces 2 and 3, reflected by the third reflection face 4 and transmitted through the second transmission face 5, and is then viewed through an eyepiece (not shown).

Figure 4:
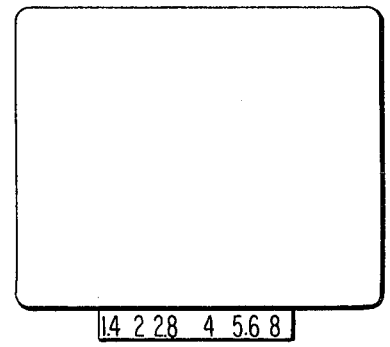
FIG. 4 in an illustration showing the location of light information in the visual field of the viewfinder.

In accordance with the present invention, a slit-shaped transparent slot 6 is formed in a part of the effective reflecting part of the third reflection face 4, for instance, along the lower edge of the face 4, and light information guided from another prism system which will hereinbelow be described is introduced into the pentaprism through the transparent slot 6, and the light information is made visible through the viewfinder in a part of the image frame, e.g., along the lower edge thereof as shown in FIG. 4.

Now the invention will be described in detail with reference to a particular embodiment thereof.

Figure 1:
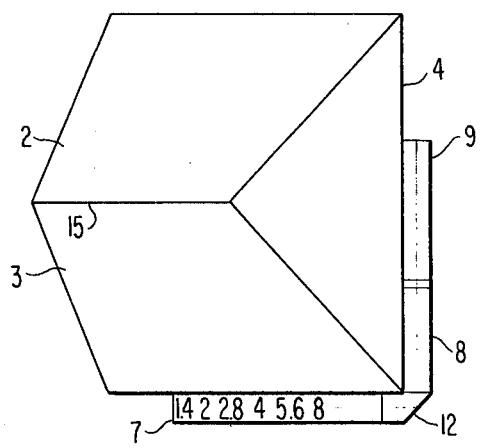
FIG. 1 is a plan view of the pentaprism in which the present invention is embodied.
Figure 2:
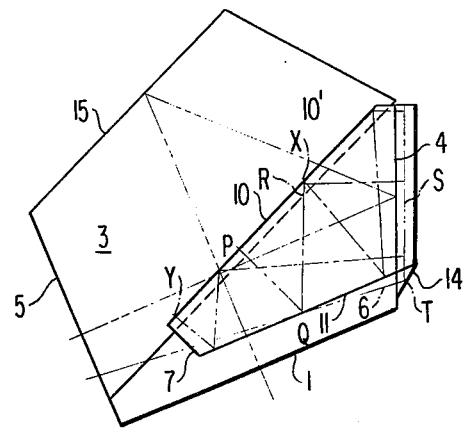
FIG. 2 is a side view of the pentaprism showing the shape of the triangular prism used in the indicating device according to the invention.
Figure 3:
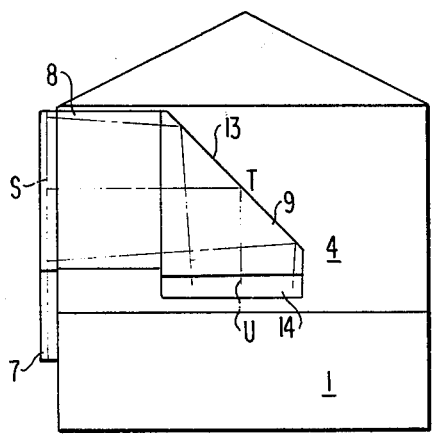
FIG. 3 is a front view showing the shape of the relay and rectangular prisms which form the second thin prism element according to the invention.

In FIGS. 1 to 3, a substantially triangular shaped prism 7 having an apex or smallest angle of about 22.5° is attached to the side face of the pentaprism, and a relay prism 8 and a rectangular prism 9 are attached to the third reflection face 4. The light information to be viewed through the viewfinder is provided in the vicinity of the surface of the first transmission face 10 of the prism system in the prism 7 on the side of the pentaprism. In the drawing, there is shown lens aperture values as an example of the information.

A part of this information is transmitted through a point P of the first transmission face 10 of the prism system, reflected at the point Q of the first reflection face 11, reflected at the point R of the second reflection face 10' (utilizing the total reflection area of the first transmission face 10), reflected at the point S of the third reflection face 12, transmitted to the relay prism 8 on the third reflection face 4 of the pentaprism, sent into the rectangular prism 9, reflected downward at the point T of the fourth reflection face 13, reflected at the point U of the fifth reflection face 14, introduced into the pentaprism through the slip-shaped transparent slot 6 at the lower portion of the third reflection face 4 of the pentaprism, and viewed along the lower edge of the image aperture as shown in FIG. 4.

The above is the same for the information entering into the triangular prism from points X and Y.

In the present invention, the special shape of the pentaprism that edge 15 formed by the first and second reflection faces 2 and 3 and the first transmission face 1 make an angle of 22.5° and the angle formed by the edge 15 and the third reflection face 4 is 45° and a triangular side face is formed thereby is well utilized. That is to say, the prism 7 is similar in shape to the triangular side face of the pentaprism and is attached to the side face in a position of analogous relation therewith, and the relay prism 8 and the rectangular prism 9 are also able to be attached to the third reflection face 4 of the pentaprism, and further almost all surfaces of the prisms can be used as adhering faces. In addition, even with these prisms attached to the pentaprism, the size of the pentaprism is not made bulky, and there is formed almost no projected part on the prism assembly. Therefore, the pentaprism and the other prisms are combined compactly and, since the prisms are fixed integrally to each other, it is very easy to handle the prism assembly with few chances of damage.

Further, since the optical path of the image in the pentaprism can be oriented in almost alignment with the optical path of the outer prism system attached to the pentaprism, there is no need to put an optical system in the optical path for adjusting diopter, and accordingly the viewfinder can be manufactured at low cost.

Further, since it is easy to make the information appear in the easy-to-see position in the image aperture, e.g., along the lower edge of the aperture, the manufacture of the prism of this invention can be carried out easily and effectively.

Further, the space is saved when the indication of the information is carried out by use of other instruments such as an ammeter pointer or a print-wired plate provided with light emitting diodes, since the part of the plate on which those elements are mounted is made parallel to the first and second reflection faces of the pentaprism.

In case that only positions of information are to be transmitted through the prism system instead of character or figure information such as the lens aperture values, shutter speeds, etc., the numerical information itself is written on the first transmission face of the pentaprism and only the position is indicated by use of a meter pointer or a light spot of a light emitting diode.

The position information made by the meter pointer or the light emitting diode is transmitted to the viewfinder through a prism system of extremely small thickness utilizing the internal reflection, of the thin prism system. By positively utilizing the internal reflection the angle between the third reflection face 12 of the prism system and the fifth reflection face 14 thereof may not be made so accurate for practical use.

As described above, the present invention results in considerable advantages. It will be apparent that the embodiment shown is only exemplary and that various modifications can be made in construction and arrangement within the scope of the invention as defined in the appended claims.

What is claimed is:

1. An information indicating device for a viewfinder of a camera using a pentaprism of the type having a first transmission face for transmitting a real image formed thereon, first, second and third reflection surfaces for internally reflecting said real image, and a second transmission face for transmitting said real image reflected from said third reflection surface, said indicating device comprising:

a thin, substantially triangular shaped prism element having a shape similar to the shape of a side face of said pentaprism and attached to the external surface of said side face and positioned to receive light information along one face of the triangular prism element, and a second thin prism means attached to the external surface of said third reflection surface and positioned to receive light information from said thin, substantially triangular shaped prism element, said third reflection surface being provided with a transparent slot within the effective reflecting area thereof, and said light information received by said thin, substantially triangular shaped prism element and transmitted to said second thin prism means being introduced into said pentaprism through said transparent slot by said second thin prism means.

2. An information indicating device as recited in claim 1 wherein said second thin prism means comprises a relay prism and a rectangular prism, said relay prism receiving light information from said substantially triangular shaped prism element and transmitting the received light information to said rectangular prism, said rectangular prism introducing said light information into said pentaprism through said transparent slot positioned along the lower edge of said real image.

3. An information indicating device as recited in claim 2 in which the edge formed by said first and second reflection surfaces and said first transmission face form an angle of 22.5° and wherein the apex or smallest angle of said thin triangular shaped prism element is about 22.5°.

* * * * *